United States Patent [19]

Hively

[11] Patent Number: 5,245,949
[45] Date of Patent: Sep. 21, 1993

[54] ANIMAL FEEDER WITH MULTIPLE ADJUSTABLE FEED VOLUME FLOW CONTROL MEANS

[76] Inventor: Lawrence R. Hively, P.O. Box 214, Roann, Ind. 46974

[21] Appl. No.: 621,582

[22] Filed: Dec. 3, 1990

Related U.S. Application Data

[63] Continuation-in-part of Ser. No. 49,456, May 14, 1987, abandoned.

[51] Int. Cl.⁵ ............................................. A01K 5/00
[52] U.S. Cl. ........................................ 119/53; 119/54
[58] Field of Search .............. 119/53, 53.5, 54, 52.1

[56] References Cited

U.S. PATENT DOCUMENTS

| | | | |
|---|---|---|---|
| 2,485,832 | 10/1949 | Keagle | 119/53.5 |
| 2,500,270 | 3/1950 | Boland | 119/53.5 |
| 3,102,511 | 9/1963 | Atcheson | 119/53 |
| 4,462,338 | 7/1984 | Thibault | 119/53 X |
| 4,729,344 | 3/1988 | Winkel | 119/53.5 |
| 4,841,912 | 6/1989 | Oswald | 119/53 |

FOREIGN PATENT DOCUMENTS

| | | | |
|---|---|---|---|
| 17925 | of 1893 | United Kingdom | 119/53 |
| 710829 | 6/1954 | United Kingdom | 119/53 |

Primary Examiner—Gene Mancene
Assistant Examiner—Thomas Price
Attorney, Agent, or Firm—Woodard, Emhardt, Naughton, Moriarty & McNett

[57] ABSTRACT

This invention is a free choice feeder for livestock and other uses with a special micro feed control. This is a self feeder which comprises a base pan and a hopper positioned above. The base pan contains a rotary feed control wheel with attached feeder rods which allows feed to flow from the hopper into the base pan. The flow of material is determined by a crank screw and locking nut to provide a continuous, non interrupted flow of feed or other material from the hopper into the base pan. The hopper and base pan is held together in a rigid position by the use of a grill work consisting of top and bottom ring and numerous grill vertical dividers.

8 Claims, 1 Drawing Sheet

ANIMAL FEEDER WITH MULTIPLE ADJUSTABLE FEED VOLUME FLOW CONTROL MEANS

CROSS-REFERENCE TO RELATED APPLICATION

This application is a continuation-in-part of Ser. No. 07/049,456 filed May 14, 1987 for Design Patent, now abandoned.

BACKGROUND

1. Field of Invention

This invention relates to free choice hog feeders, specifically to such feeders which are used to feed hogs and other livestock. The feeder contains a base pan and a feed containing hopper. The base pan includes rotary spokes connected to a base control plate which dispenses feed when moved or agitated which controls the rate of flow of feed at a predetermined setting.

2. Description of Prior Art

In the commercial feeding of livestock, free choice of feed for livestock has always been a selected choice for dispensing feed to livestock.

However, feed waste has always been a problem. Over the years many solutions have been sought. U.S. patent issued to Nichols (1887) U.S. Pat. No. 368,161 attempted to solve some of the problems of feed waste, however, this feeder and subsequent feeders have only partially solved some of the problems facing the livestock industry.

Almost all feeders have missed the mark for designing a feeder which could be used under less than ideal conditions such as open exposure with inclement weather. U.S. Pat. No. 4,462,338 to Osborne discloses a complex feed dispensing system which allows livestock animal to brush away old feed and dispense new feed allowing excessive waste because of the feed waste caused by the natural action and mannerisms of livestock. U.S. Pat. No. 4,729,344 to Dwinkel (1988) attempts to solve the problem of feed wastage, but in the process the feed control mechanism is situated in such a manner that it allows moisture from rain and other sources to cause the feed supply to become spoiled and to also allow the moisture to have a "wick like" action to cause the moisture to travel back up into the main storage hopper and to either cause the feed to be extremely difficult to dispense or in spoilage to the natural action of water mixed with feed in a container such as the hopper.

Although many of these feeding problems can be overcome by feeding and storing small amounts of feed, they neverthless do not provide the satisfaction of a feeder that provides for long term storage of feed and can be used under almost any weather conditions.

Several types of feeders-for example, U.S. Pat. No. 2,513,200 to Pax (1950), U.S. Pat. No. 3,033,164 to Evers (1962) and U.S. Pat. No. 3,951,107 to Doty (1976) among others have proven difficult for the farmer to maintain in the way of destruction to the feeder by normal usage and by the materials used in their manufacture plus feed waste. Other examples of self feeders, as disclosed in prior art, cause problems because of their over design in complexity for the simple task of dispensing feed at an animal's choice and the loading of the feeder at the operator's choice. Some of these disadvantages are also reflected in the problem of feed "bridging over" and not allowing feed to evenly dispensed into the feed recepticle where it is consumed by the animal. Also, many of the feed mechanisms of these patented feed systems simply disintegrate from use and weather conditions and are so made that they are impossible to ever repair and as such, must be thrown away while other parts of the feeder are still serviceable thus causing a financial loss to the livestock operator.

OBJECTS AND ADVANTAGES

Accordingly, to overcome many of the problems inherent with feeder designs, several objects and advantages of my invention are:

(a) its basic components are a hopper made of rust proof plastics, base pan also of rust proof plastic, deflector (which controls the rate of flow) and the feed wheel plus a control mechanism. The general shape of the device is circular. The sidewall of the hopper has an upper and lower portions, each which taper inward toward the bottom of the dispenser. The taper on the lower portion of the sidewall of the hopper is greater than that of the upper sidewall taper, so that the bottom portion of the hopper wall has a steeper angle than the sidewall of the upper portion. The bottom of the base pan is flat, with sidewalls coming up so as to create a concave cavity.

The deflector is conical in shape, and is sized to fit under the lower portion of the hopper to create a seal formed by the aperture of the lower portion of the above hopper. The deflector is flat and round like a disk and is connected to by feed rods which extend outward and down into the base pan.

(b) to provide a system so that all parts work in harmony with one another, in the hopper is the deflector which is conical in shape, and a size to fit into the hopper at approximately the angle or joint formed by the upper and lower sidewalls of the hopper. The deflector acts merely to prevent feed in the upper hopper from "bridging over" in the center of the feeder and leaving a portion of the feed stuck to the sidewalls;

(c) to provide a feeding system that can be used in any weather and will provide the major functions such as storing feed and giving the hog or animal fresh feed at any time for their use;

(d) to provide a base pan that will hold feed in all weather and still not allow moisture to back up through the feed dispensing system to spoil the feed in the hopper;

(e) all working parts are constructed in such a manner and with common materials commonly found in any metal or welding supply shop so that all parts can be repaired and or rebuilt, if necessary, over the years from ordinary wear and tear and or outside damage such as being backed over by a tractor; and (f) to provide a hopper and base that will give extended use plus be able to dispense almost any type feed ranging from ground feed, shelled corn to high moisture feeds.

Further objects and advantages are to provide a hog feeder that needs little maintenance, components can be rebuilt, is simple to use and is so designed that an animal can quickly learn to cause feed to be discharged with almost no prior experience or exposure whatsoever. Still further objects and advantages will become apparent from a consideration of the ensuing description and drawings.

DRAWING FIGURES

In the drawings, closely related figures or objects of use have the same number but different alphabetic suffixes.

Figure 1:
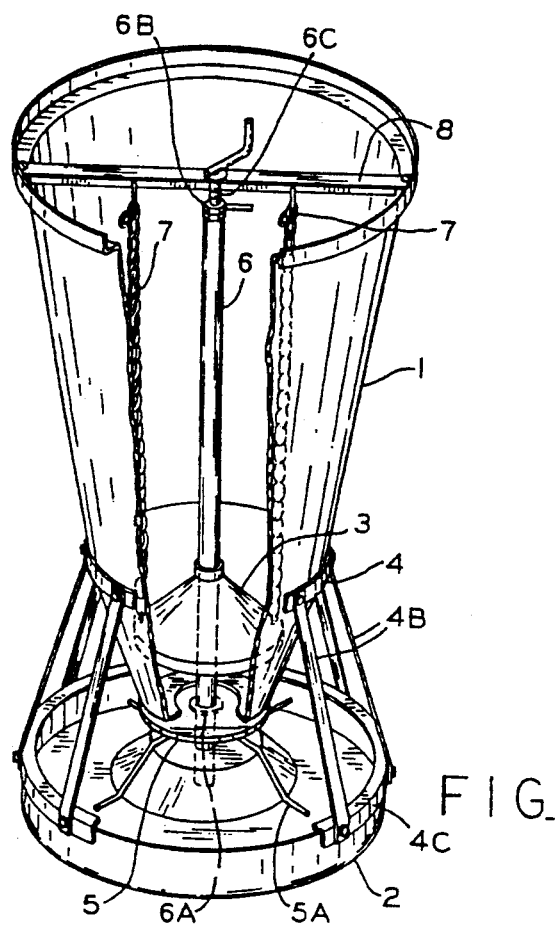
FIG. 1 shows a cut-away view in perspective of the over-all feeder and its various components.
Figure 2:
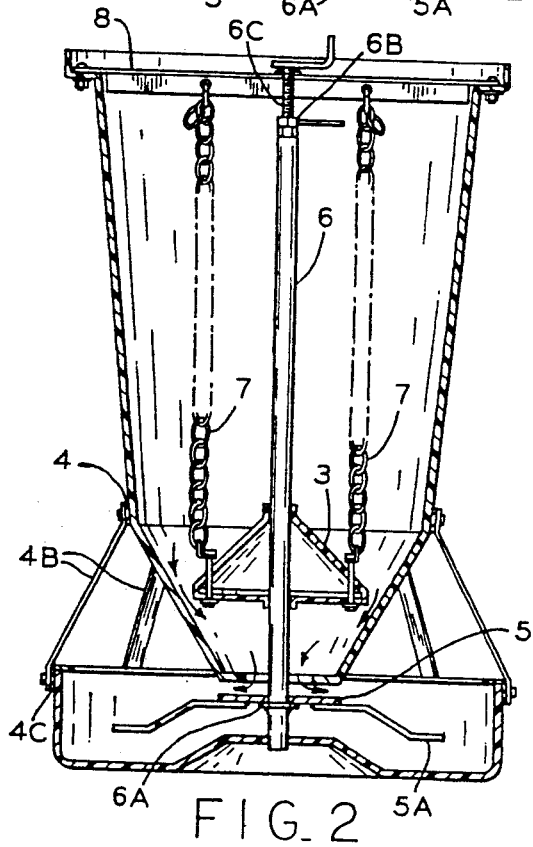
FIG. 2 shows a side view (cut in half) of feeder with conical deflector (3) in its most closed position.
Figure 3:
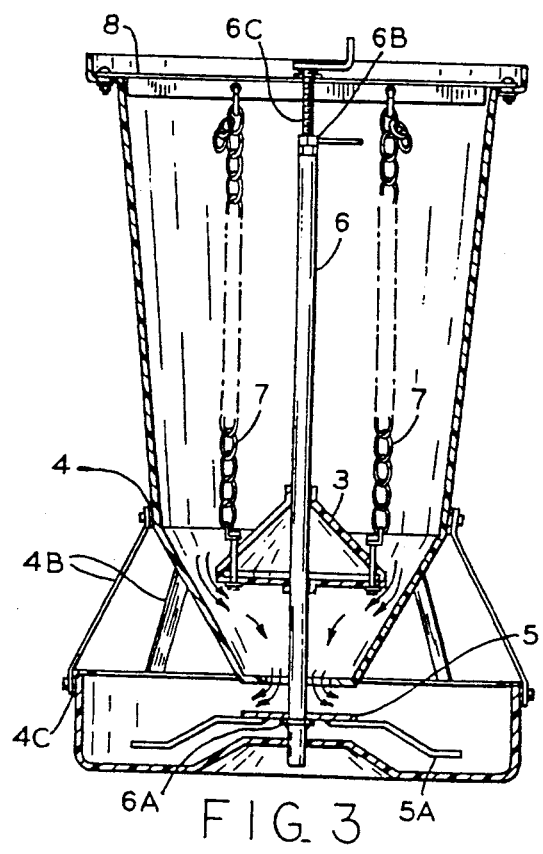
FIG. 3 shows the same view with the conical deflector (3) in a more open position.

REFERENCE NUMERALS IN DRAWINGS 1 hopper
2 base pan
3 deflector
4a top grill ring
4b grill vertical dividers
4c bottom ring
5 feed control wheel
5a feeder rods
6 control axle
6a welded disk
6b locking control nut
6c crank screw
7 conical stabilizers (2)
8 top mounting bar

DESCRIPTION OF PREFERRED EMBODIMENTS

As required, I have illustrated in FIG. 1 a perspective cut-away view of feeder 1. Detailed embodiments of my invention herein described is not intended to be exhaustive or to limit my invention to the precise form disclosed. It is shown so that someone familiar and skilled in the art to employ my invention to enable others to utilize the invention.

Referring to the drawings in more detail, the reference numeral 1 shows the conical hopper part of the feeder which would retain a supply of feed. Numeral 2 shows the base pan which receives the feed and would act as a retainer for any excess feed not immediately consumed. Numeral 3 is the deflector which can be raised and lowered by means of stabilizers to either increase or decrease the outer opening as required by the degree of fineness or courseness of the feed. The reference 4 illustrates the top ring of the grill assembly which is attached to hopper (1) by mechanical means and grill top ring (4a) is attached to bottom ring (4c) by means of equally spaced grill verticle dividers (4b).

The feed flow function is performed solely by feed wheel (5). Feed wheel's (5) components include one or more feeder rods (5a). Feed control plate is mounted on axle (6) extending from base pan through center of hopper (1) to top mounting bar (8). Directly under feed control plate (5) is permanently welded metal disk (6a) to axle (6) which allows verticle movement of control plate (5) by means of crank screw means and crank (6c) at top of feed wheel (5). By an upward movement of axle (6), feed control wheel (5) moves toward feed dispensing opening, thereby restricting the flow of feed through opening. Further upward movement of axle (6) will cause feed control wheel (5) to contact the bottom of hopper (1), thereby sealing off feed dispersal opening entirely.

Feed is fed through the feed dispersing opening of hopper (1) solely by gravity and vibration causing a natural downward movement of feed into base pan (2).

Since feed control wheel 5 is not attached to axle 6, but instead simply rests atop welded disc 6A, the feed control wheel is free to revolve around the axle without the axle ever rotating. Furthermore, because the hole in the feed control wheel is made slightly larger than the diameter of axle 6, there is a certain amount of wobble or up and down play possible on the top of feed control wheel 5. This ability of the feed control wheel to rotate and wobble with respect to a fixed axle truly sets the present feeder apart from all other feeders currently available.

In operation, feed is loaded into hopper (1) through the open top of hopper (1) and flows past deflector (3) into lower portion of hopper (1). Additional feed is available by movement of feed control wheel (5) caused by the movement of feeder rods (5a) by the livestock.

The rate of feed flow from hopper (1) is controlled entirely by manual operation of screw crank (6c) having positions locknut and as such the animal is only allowed to dispense feed at the rate determined by the manual setting of feed control wheel (5) which is pre-set by the operator by determining the length of axle (6).

With some grains and materials, the opening between feed control wheel 5 and the base of hopper 1 needs to be set very fine, and for others, it needs to be more generous in order to adequately dispense the feed from the hopper By experience the operator is able to pre-set the opening at bottom of hopper (1) and feed control wheel (5). This means that the animal is always receiving 100 per cent fresh feed as at no time can the animal cause contaminated feed to come in contact with undispersed feed from hopper (1).

Also, because of the distance from feed control wheel (5) to bottom of base pan (2) it is impossible for moisture to work back into feed still stored in hopper (1).

Furthermore, because of uniqueness of design, that is the location of feed control wheel (5) and base pan (2), the operator is able to flood base pan (2) with water so that feeder assembly can be used as either a means of watering or can also be used as a means of permanently dispensing water or other liquids in base pan (2) so that the animal is able to consume its feed in a slurry or porridge-like consistency.

Many animals today are fed with this water-based type mixture as a means of both cutting down on dust and allowing the animal to consume larger volumes of water which aids in weight gains, thus enabling this invention to be used both as a dry and wet feeder.

Accordingly, the reader can see that this invention will serve a wide range of feed choices and either wet or dry feeds. Furthermore, the feeder has the additional advantage in that:

it permits the livestock operator to change dry or wet feed without any extra effort whatsoever;

it permits the operator to determine the number of hogs or other animals that can be fed from a particular feeder by simply varying the number of grill vertical dividers (4b) in each feeder;

it provides a feeder which can be used indoors and outdoors in all types of weather;

it provides the livestock user, or any other application that may be appropriate to utilize the principals as to feed dispensing abilities.

Although the descriptions above contain many specificities, these should not be construed as limiting the scope of the operation, but as merely providing illustrations of some of the presently preferred embodiments of this invention. For an example, the hopper (1) can have other shapes, such as oval, triangular, etc.; Crank screw (6c) could be powered by an electrical motor device or by an arm and lever principle.

Thus, the scope of this invention should be determined not by the illustrations described herein except as insofar as such limitations are included in the following claims.

I claim and desire to secure by Letters Patent is:

1. A livestock feeder comprising:
   a feed hopper having conically shaped side walls, a top opening and a bottom opening;
   a base pan having a bottom, side walls and an upper rim, said base pan being sized to receive and hold an amount of feed therein;
   frame means, attached to said feed hopper and said base pan, for supporting said feed hopper above said base pan;
   a mounting bar attached to and extending across said feed hopper;
   a vertical axle connected to said mounting bar and extending through said bottom opening of said feed hopper;
   a support member connected to said vertical axle below said bottom opening of said feed hopper;
   a feed control plate rotatably mounted about said vertical axle and being supported by said support member below said bottom opening, said feed control plate being sized to cover said bottom opening and having at least one feeder rod extending therefrom into said base pan;
   a deflector suspended from said mounting bar above said bottom opening within said feed hopper; and
   means for selectively adjusting the distance between said support member and said bottom opening to thereby control the distance between said feed control plate and said bottom opening to regulate the amount feed that is allowed to pass from said feed hopper into said base pan.

2. The livestock feeder of claim 1 wherein said feed control plate is loosely mounted about said vertical axle so that said plate is free to rotate about said axle and free to slide up and down said axle between said support member and said bottom opening.

3. The livestock feeder of claim 1 wherein said feed control plate is free to wobble from a normally horizontal position when said at least one feeder rod is moved.

4. The livestock feeder of claim 3 wherein said vertical axle is suspended from said mounting bar at one end and having an opposite end extending through a hole in said base pan.

5. A livestock feeder comprising:
   a feed hopper having conically shaped side walls, a top opening and a bottom opening;
   a base pan having a bottom, side walls and an upper rim, said base pan being sized to receive and hold an amount of feed therein;
   frame means, attached to said feed hopper and said base pan, for supporting said feed hopper above said base pan;
   a mounting bar attached to and extending across said feed hopper;
   a vertical axle having a diameter connected to said mounting bar and extending through said bottom opening of said feed hopper;
   a support member connected to said vertical axle below said bottom opening of said feed hopper;
   a feed control plate having a hole therethrough larger than said diameter of said vertical axle rotatably mounted about said vertical axle and being supported by said support member below said bottom opening, said feed control plate being sized to cover said bottom opening and being free to rotate and wobble with respect to said axle;
   a deflector suspended from said mounting bar above said bottom opening within said feed hopper; and
   means for selectively adjusting the distance between said support member and said bottom opening to thereby control the distance between said feed control plate and said bottom opening to regulate the amount feed that is allowed to pass from said feed hopper into said base pan.

6. The livestock feeder of claim 5 wherein said feed control plate includes at least one feeder rod attached thereto and extending into said base pan.

7. The livestock feeder of claim 6 wherein said at least one feeder rod is four feeder rods attached to and extending in different directions from said feed control plate.

8. The livestock feeder of claim 7 wherein said vertical axle is suspended from said mounting bar at one end and having an opposite end extending through a hole in said base pan.

* * * * *